United States Patent
Phan-Anh et al.

(10) Patent No.: US 9,918,222 B2
(45) Date of Patent: Mar. 13, 2018

(54) RECOVERY TECHNIQUES IN MOBILE NETWORKS

(71) Applicant: Intellectual Ventures I LLC, Wilmington (DE)

(72) Inventors: Son Phan-Anh, Budapest (HU); Balint Benko, Budapest (HU); Auvo Hartikainen, Budapest (HU); Markku Verkama, Espoo (FI); Heikki Juhani Einola, Espoo (FI); Stefano Faccin, Hayward, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

(21) Appl. No.: 15/226,422

(22) Filed: Aug. 2, 2016

(65) Prior Publication Data
US 2017/0078871 A1  Mar. 16, 2017

Related U.S. Application Data

(60) Continuation of application No. 14/549,714, filed on Nov. 21, 2014, now Pat. No. 9,432,842, which is a continuation of application No. 14/058,473, filed on Oct. 21, 2013, now Pat. No. 8,923,846, which is a continuation of application No. 13/682,230, filed on Nov. 20, 2012, now Pat. No. 8,600,372, which is a continuation of application No. 13/484,583, filed on May 31, 2012, now Pat. No. 8,351,924, which is a continuation of application No. 13/097,709, filed on Apr. 29, 2011, now Pat. No. 8,200,211, which is a
(Continued)

(51) Int. Cl.
*H04W 40/00* (2009.01)
*H04W 8/26* (2009.01)
*H04W 24/04* (2009.01)
*H04W 24/02* (2009.01)
*H04W 8/30* (2009.01)

(52) U.S. Cl.
CPC ............... *H04W 8/26* (2013.01); *H04W 8/30* (2013.01); *H04W 24/02* (2013.01); *H04W 24/04* (2013.01)

(58) Field of Classification Search
CPC .......... H04W 8/26; H04W 8/30; H04W 24/02
USPC .............................. 455/445, 414.1, 415, 417
See application file for complete search history.

(56) References Cited

U.S. PATENT DOCUMENTS 5,077,830 A  12/1991 Mallia
5,274,694 A  12/1993 Lechner et al.
(Continued)

OTHER PUBLICATIONS

Final Office Action on U.S. Appl. No. 14/058,473, dated Jun. 6, 2014.
(Continued)

*Primary Examiner* — Nghi H Ly (57) ABSTRACT

A technique for protecting location information of a subscriber in a mobile network is disclosed. A User Mobility Server (UMS) receives a first query from a first call state control function (CSCF). The UMS transmits a call setup and a subscriber identity to a servicing-call state control function (S-CSCF). The S-CSCF may have no record of the subscriber identity due to a restart are some other event. The UMS receives a second query from the S-CSCF based in part of the subscriber identity. The UMS transmits a home address of a mobile station to the S-CSCF. The UMS may also transmit a profile download to the S-CSCF.

18 Claims, 6 Drawing Sheets

Related U.S. Application Data continuation-in-part of application No. 12/720,862, filed on Mar. 10, 2010, now Pat. No. 7,937,081, which is a division of application No. 09/082,861, filed on Mar. 12, 2001, now Pat. No. 7,769,374.

(56) References Cited

U.S. PATENT DOCUMENTS

| | | | |
|---|---|---|---|
| 5,463,672 A | 10/1995 | Kage | |
| 5,561,854 A | 10/1996 | Antic et al. | |
| 6,097,942 A | 8/2000 | Laiho | |
| 6,163,532 A | 12/2000 | Taguchi et al. | |
| 6,374,302 B1 | 4/2002 | Galasso et al. | |
| 6,408,182 B1 | 6/2002 | Davidson et al. | |
| 6,411,632 B2 | 6/2002 | Lindgren et al. | |
| 6,445,911 B1 | 9/2002 | Chow et al. | |
| 6,584,098 B1 | 6/2003 | Dutnall | |
| 6,587,882 B1 | 7/2003 | Inoue et al. | |
| 6,594,490 B1 | 7/2003 | Toyoda et al. | |
| 6,600,920 B1 | 7/2003 | Stephens et al. | |
| 6,636,491 B1 | 10/2003 | Kari et al. | |
| 6,654,606 B1 | 11/2003 | Foti et al. | |
| 6,707,813 B1 | 3/2004 | Hasan et al. | |
| 6,721,291 B1 | 4/2004 | Bergenwall et al. | |
| 6,732,177 B1 | 5/2004 | Roy | |
| 6,763,233 B2 | 7/2004 | Bharatia | |
| 6,775,255 B1 | 8/2004 | Roy | |
| 6,839,323 B1 | 1/2005 | Foti | |
| 6,859,448 B1 | 2/2005 | Roy | |
| 7,006,449 B2 | 2/2006 | Teraoka | |
| 7,092,390 B2 | 8/2006 | Wan | |
| 7,221,940 B2 | 5/2007 | Kaneko et al. | |
| 7,602,762 B1* | 10/2009 | Kauppinen | H04L 29/06027 370/349 |
| 7,769,374 B2 | 8/2010 | Phan-Anh et al. | |
| 7,937,081 B2 | 5/2011 | Phan-Anh et al. | |
| 8,514,808 B2 | 8/2013 | Cheng et al. | |
| 8,554,231 B2 | 10/2013 | Jones | |
| 8,600,372 B2 | 12/2013 | Phan-Anh et al. | |
| 8,923,846 B2 | 12/2014 | Phan-Anh et al. | |
| 2004/0121775 A1* | 6/2004 | Ropolyi | H04L 63/00 455/445 |
| 2009/0029701 A1 | 1/2009 | Mishima | |
| 2011/0076991 A1 | 3/2011 | Mueck et al. | |
| 2011/0319089 A1* | 12/2011 | Sharma | H04W 76/026 455/445 |

OTHER PUBLICATIONS

International Preliminary Examination Report for PCT/IB02/00721 dated Apr. 3, 2003.
International Search Report for PCT/IB02/00721, dated Feb. 26, 2003.
Non-Final Office Action on U.S. Appl. No. 13/097,709, dated Sep. 1, 2011.
Non-Final Office Action on U.S. Appl. No. 14/058,473, dated Dec. 2, 2013.
Non-Final Office Action on U.S. Appl. No. 14/549,714, dated Nov. 18, 2015.
Notice of Allowance on U.S. Appl. No. 14/549,714 dated May 11, 2016.
Notice of Allowance on U.S. Appl. No. 12/720,862, dated Dec. 27, 2010.
Notice of Allowance on U.S. Appl. No. 13/097,709, dated Feb. 22, 2012.
Notice of Allowance on U.S. Appl. No. 13/484,583, dated Sep. 12, 2012.
Notice of Allowance on U.S. Appl. No. 13/682,230, dated Jul. 17, 2013.
Notice of Allowance on U.S. Appl. No. 14/058,473 dated Sep. 2, 2014.
Office Action on U.S. Appl. No. 12/720,862, dated Jul. 8, 2010.
Technical Report TR 23.821 V1.0.1, published Jul. 2000 by the 3rd Generation partnership Project 3GPP.

* cited by examiner

RECOVERY TECHNIQUES IN MOBILE NETWORKS

CROSS-REFERENCE TO RELATED PATENT APPLICATIONS

This application is a Continuation of U.S. application Ser. No. 14/549,714, which is a Continuation of U.S. application Ser. No. 14/058,473, filed Oct. 21, 2013, which is a Continuation of U.S. application Ser. No. 13/682,230, filed Nov. 20, 2012 (now U.S. Pat. No. 8,600,372), which is a Continuation of U.S. application Ser. No. 13/484,583, filed May 31, 2012 (now U.S. Pat. No. 8,351,924), which is a Continuation of U.S. application Ser. No. 13/097,709, filed Apr. 29, 2011 (now U.S. Pat. No. 8,200,211, which is a Continuation-in-Part of U.S. application Ser. No. 12/720,862, filed Mar. 10, 2010 (now U.S. Pat. No. 7,937,081, which is a Divisional of U.S. application Ser. No. 09/802,861, filed Mar. 12, 2001, (now U.S. Pat. No. 7,769,374) all of which are incorporated herein by reference in their entirety.

FIELD

The present disclosure relates to recovery techniques for use in mobile networks. More particularly, the present disclosure relates to protecting the Transport Address (TA) which is a current Care of Address of a mobile subscriber is reachable from loss and after Call State Control Function (CSCF) crashes and after reset situations of a network element realizing CSCF functionality.

DESCRIPTION OF RELATED ART

Technical Report TR 23.821 V1.0.1, published July 2000 by the 3rd Generation Partnership Project (3GPP) and available on the Internet at http://www.3gpp.org, discloses the specifications of a 3G All-IP mobile network and this report is incorporated by reference herein in its entirety.

Figure 1:
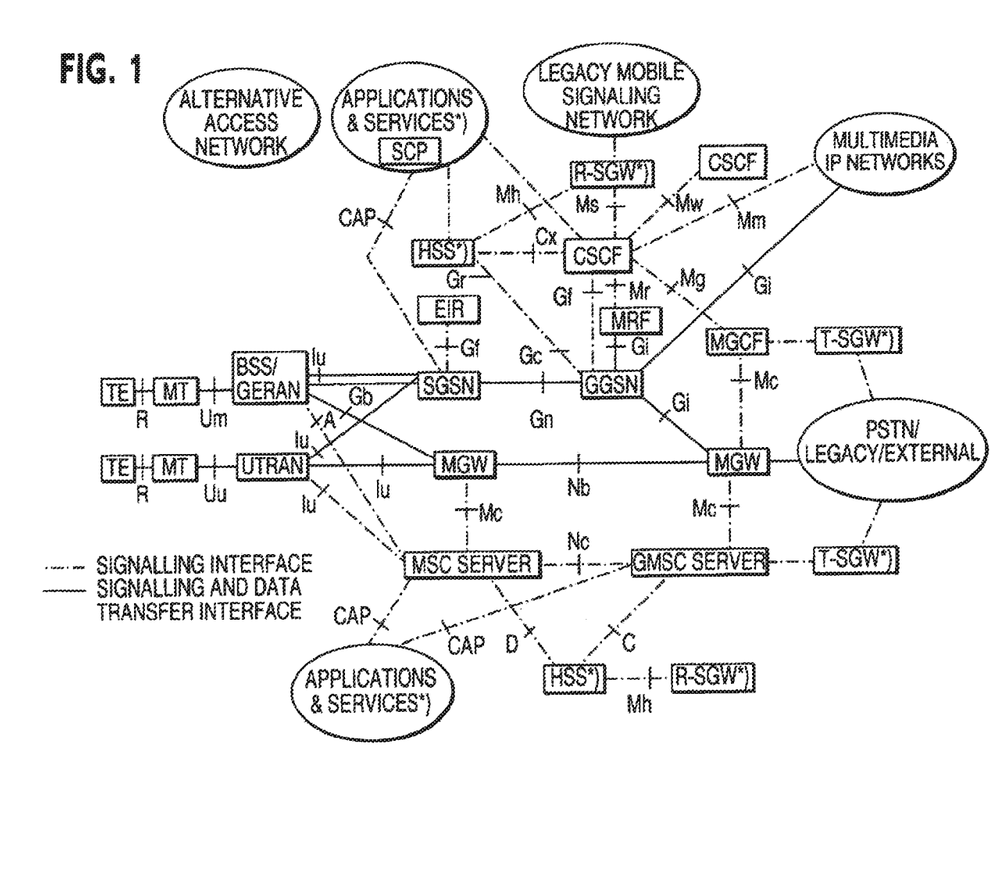
FIG. 1 illustrates the architecture of a 3G All-IP mobile network.

FIG. 1 illustrates the architecture of the network disclosed in the above-noted Technical Report. The elements shown with asterisks are elements which have been duplicated for figure layout purposes only. These duplicated elements belong to the same logical element in the reference model.

Unfortunately, the network disclosed in the Technical Report fails to include any protection of the TA of a 3G All-IP subscriber from loss. Furthermore, the network disclosed in the Technical Report fails to protect the IP address of a subscriber in the case of a reset situation of a network element realizing CSCF functionality, that is, a CSCF, thereby preventing recovery after a reset of the network element. Still furthermore, the network disclosed in the Technical Report fails to protect the location information of a subscriber after a CSCF crash, thereby preventing recovery after a CSCF crash.

SUMMARY

An object of the present disclosure is to provide a technique for recovering location information of a subscriber in a mobile network including forwarding a registration request from the subscriber to an S-CSCF including the subscriber's TA and then forwarding an AL (Application Level) location update from the S-CSCF to a Home Subscriber Server (HSS) including the subscriber's TA and the (S-CSCF) address and storing data including the subscriber's TA and the S-CSCF address in the HSS so as to be protected against loss.

Another object of the present disclosure is to provide a technique for recovering location information of a subscriber in a mobile network including forwarding a registration request from the subscriber to an S-CSCF including the subscriber's TA and then forwarding an AL location update from the S-CSCF to an HSS including the S-CSCF address and storing data including the subscriber's TA in a non-volatile memory of the S-CSCF so as to be protected against loss.

Yet another object of the present disclosure is to provide a technique for recovering location information of a subscriber in a mobile network including upon an S-CSCF receiving a call setup request for the subscriber from an Interrogating Call State Control Function (I-CSCF), forwarding a route request to a User Mobility Server (UMS) and receiving a home address of the subscriber and then forwarding the call setup request from the S-CSCF to a home agent at the home address of the subscriber and then forwarding the call setup request from the home agent to the subscriber and subsequently forwarding an address update from the subscriber to the S-CSCF.

BRIEF DESCRIPTION OF THE DRAWINGS

The foregoing and a better understanding of the present disclosure will become apparent from the following detailed description of example embodiments and the claims when read in connection with the accompanying drawings, all forming a part of the disclosure of this disclosure. While the foregoing and following written and illustrated disclosure focuses on disclosing example embodiments of the invention, issued a clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE PREFERRED EMBODIMENTS

Before beginning a detailed description of the subject disclosure, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Lastly, other components may not be shown within the drawing figures for simplicity of illustration and discussion and so as not to obscure the invention.

In the application level of a 3G All-IP network, the reachability of a subscriber is maintained in two levels, namely, the network element level and the subscriber level. The S-CSCF that the subscriber is currently registered to and the TA of the roaming subscriber, which the subscriber provides to the network during Application Level (AL) registration, must be known to and maintained by the network.

Without specific support for mobility in IPv6, packets destined to a mobile subscriber would not be able to reach it while the subscriber is away from its home link (the link on which its home IPv6 subnet prefix is in use), since routing is based on the subnet prefix in a packet's destination IP address. In order to continue communication in spite of its movement, a subscriber could change its IP address each time it moves to a new link, but it would then not be able to maintain transport and higher-layer connections when it changes location.

Mobile IPv6 allows a subscriber to move from one link to another without changing its IP address. A subscriber is always addressable by its "home address", an IP address assigned to it within its home subnet prefix on its home link. Packets may be routed to the subscriber using this address regardless of its current point of attachment to the Internet, and it may continue to communicate with others after moving to a new link. The movement of a subscriber away from its home link is thus transparent to transport and higher-layer protocols and applications.

A mobile subscriber is always addressable by its home address, whether it is currently attached to its home link or is away from home. While it is at home, packets addressed to its home address are routed to it using conventional Internet routing mechanisms in the same way as if it were never mobile. Since the subnet prefix of its home address is the subnet prefix (or one of the subnet prefixes) on the subscribers' home link (it is the mobile subscribers' home subnet prefix), packets addressed to it will be routed to its home link.

While a subscriber is attached to some foreign link away from home, it is also addressable by one or more care-of addresses, in addition to its home address. A care-of address is an IP address associated with a mobile node while the subscriber is visiting a particular foreign link. The subnet prefix of a subscriber's care-of address is the subnet prefix (or one of the subnet prefixes) on the foreign link being visited by it; if it is connected to this foreign link while using that care-of address, packets addressed to this care-of address will be routed to the subscriber in its location away from home.

The association between a subscriber's home address and care-of address is known as a "binding" for the subscriber. It typically acquires its care-of address through stateless or stateful Address Autoconfiguration, according to the methods of IPv6 Neighbor Discovery. Other methods of acquiring a care-of address are also possible, such as static preassignment by the owner or manager of a particular foreign link, but details of such other methods are beyond the scope of this discussion.

While away from home, a mobile subscriber registers one of its care-of addresses with a router on its home link, requesting this router to function as the "home agent" for it. This binding registration is done by the subscriber sending to the home agent a packet containing a "Binding Update" destination option; the home agent then replies to the subscriber by returning a packet containing a "Binding Acknowledgment" destination option. The care-of address in this binding registered with its home agent is known as the subscriber's "primary care-of address". The subscribers' home agent thereafter uses proxy Neighbor Discovery to intercept any IPv6 packets addressed to the subscribers' home address (or home addresses) on the home link and tunnels each intercepted packet to the subscribers' primary care-of address. To tunnel each intercepted packet, the home agent encapsulates the packet using IPv6 encapsulation, with the outer IPv6 header addressed to the subscribers' primary care-of address.

Keeping the address of the S-CSCF ensures that a call to a subscriber can be routed to the destination node, that is, the S-CSCF. Keeping the current TA of the subscriber ensures that a call made to the subscriber which arrives at the S-CSCF can finally reach the subscriber.

Figure 2:
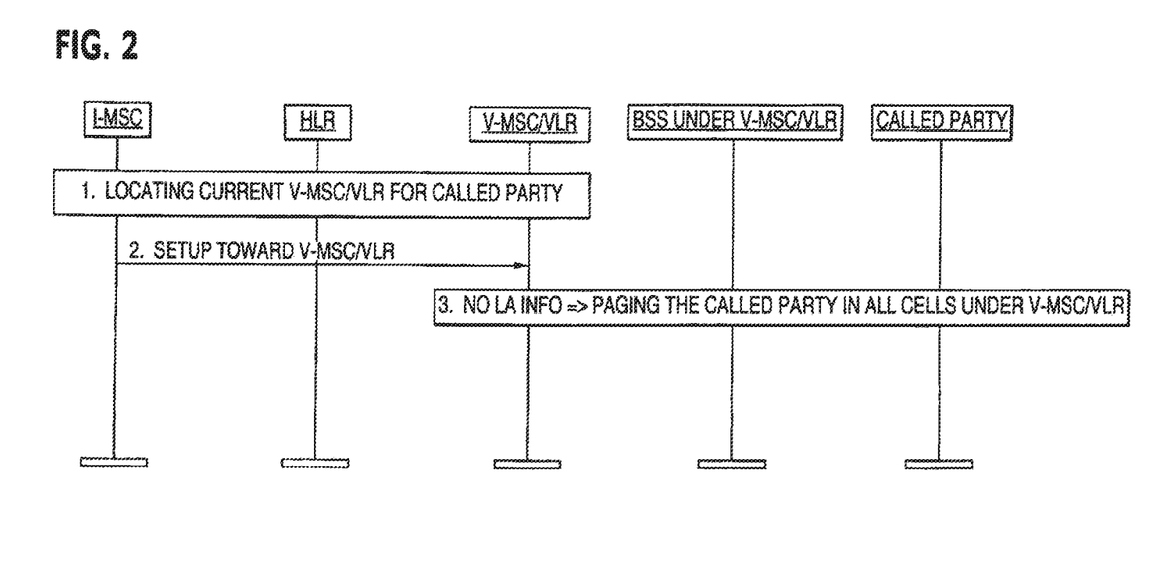
FIG. 2 illustrates reaching a called party after losing LA (Location Area) information in a legacy mobile network.

As illustrated in FIG. 2, in legacy mobile networks, such as GSM, the information on the serving MSC/VLR (stored in the HLR) is adequate. That is, the called party can be reached even after the loss of the subscriber location area (LA) information by a searching/paging mechanism. In step 1, the current V-MSC/VLR for a called party is first located and in step 2 a setup toward the V-MSC/VLR is performed. In step 3, upon a loss of the LA information, the called party is paged in all cells under the V-MSC/VLR.

Figure 3:
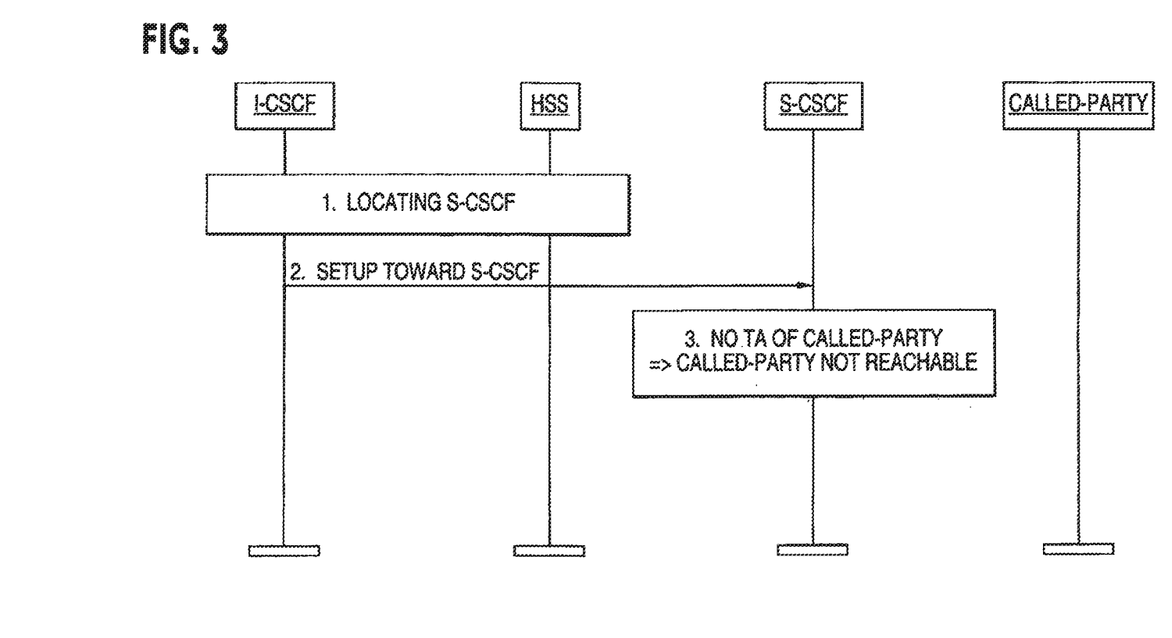
FIG. 3 illustrates failure to reach a called party after losing TA information in a 3GPP All-IP mobile network.

On the other hand, as illustrated in FIG. 3, in the 3G All-IP network, no such searching mechanism is available, so that the information of the current S-CSCF (stored in the HSS) is insufficient to reach the subscriber upon the loss of the subscriber TA. In step 1, S-CSCF is located and in step 2 a setup toward the S-CSCF is performed. However, in step 3, in the absence of the TA of the called party, the called parry is not reachable.

The applicants have determined that the TA of a 3G All-IP subscriber should be protected against loss with the same level of security as that for the Serving CSCF (S-CSCF). The applicants have proposed options to protect the TA of a subscriber, namely, one option in which the TA is forwarded to the HSS and another option in which there is a security backup of the TA within the CSCF. The TA of the subscriber should be forwarded to the HSS at registration and downloaded from the HSS to the S-CSCF during recovery. Still another option is to have a permanent IPv6 (Internet Protocol Version 6) address allocated to the subscriber and to have the subscriber update its current Care-of Address (part of the TA) to the Home Agent upon obtaining the current TA.

As noted above, in accordance with the present disclosure, various options are available for implementing protection and recovery of the subscriber TA.

Figure 4A:
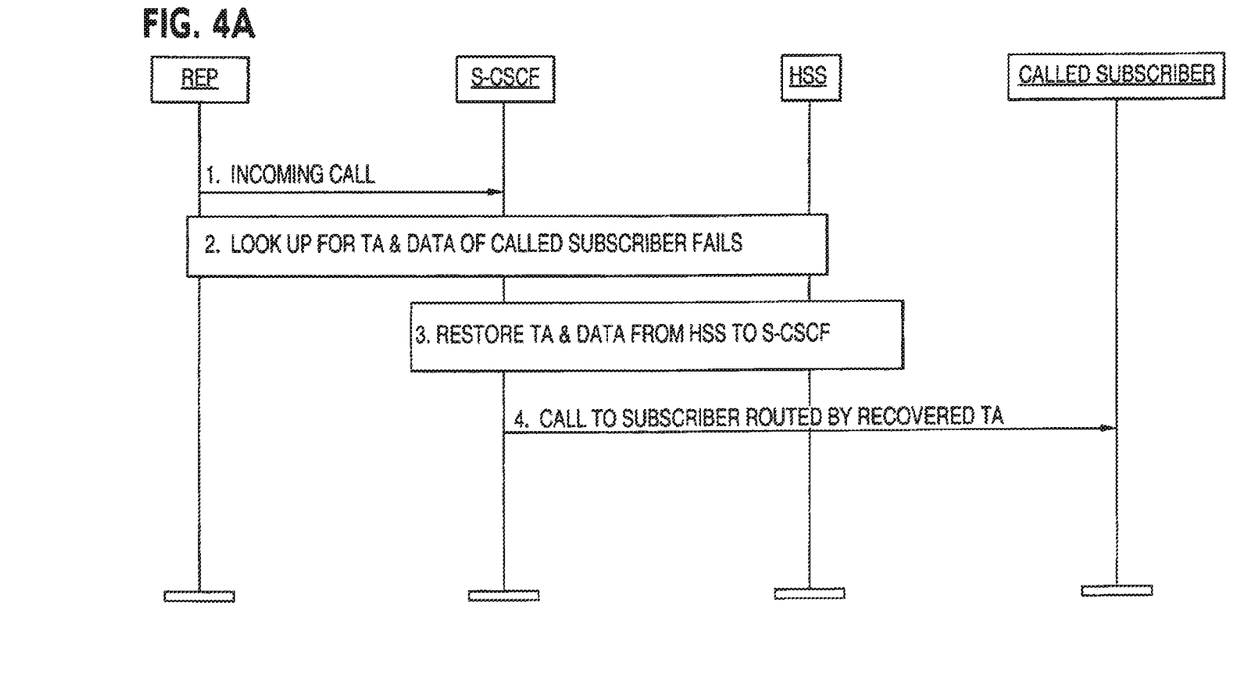
FIG. 4A illustrates sending subscriber TA to S-CSCF and then forwarding it to HSS at registration.

In the first option, as illustrated in FIG. 4A, "a safe copy" of the subscriber's TA is forwarded to the HSS for storage and protection. The TA must enjoy the same level of protection against loss as the S-CSCF address. The TA and other data can then be restored to the S-CSCF upon the earlier loss of the data by the S-CSCF. It is noted that the subscriber's TA is stored in the S-CSCF for normal operation. An incoming call from an REP (Remote End-Point) is received by the S-CSCF in step 1. In step 2, the S-CSCF looks for the subscriber's TA so as to route the call but fails to find the subscriber's TA. In step 3, the S-CSCF initiates the restoration of the subscriber's TA (and possibly other data) from the HSS. This option is only available when the S-CSCF loses only the TA of the subscriber. Finally, in step 4, the call is then routed to the subscriber using the recovered TA.

Figure 4B:
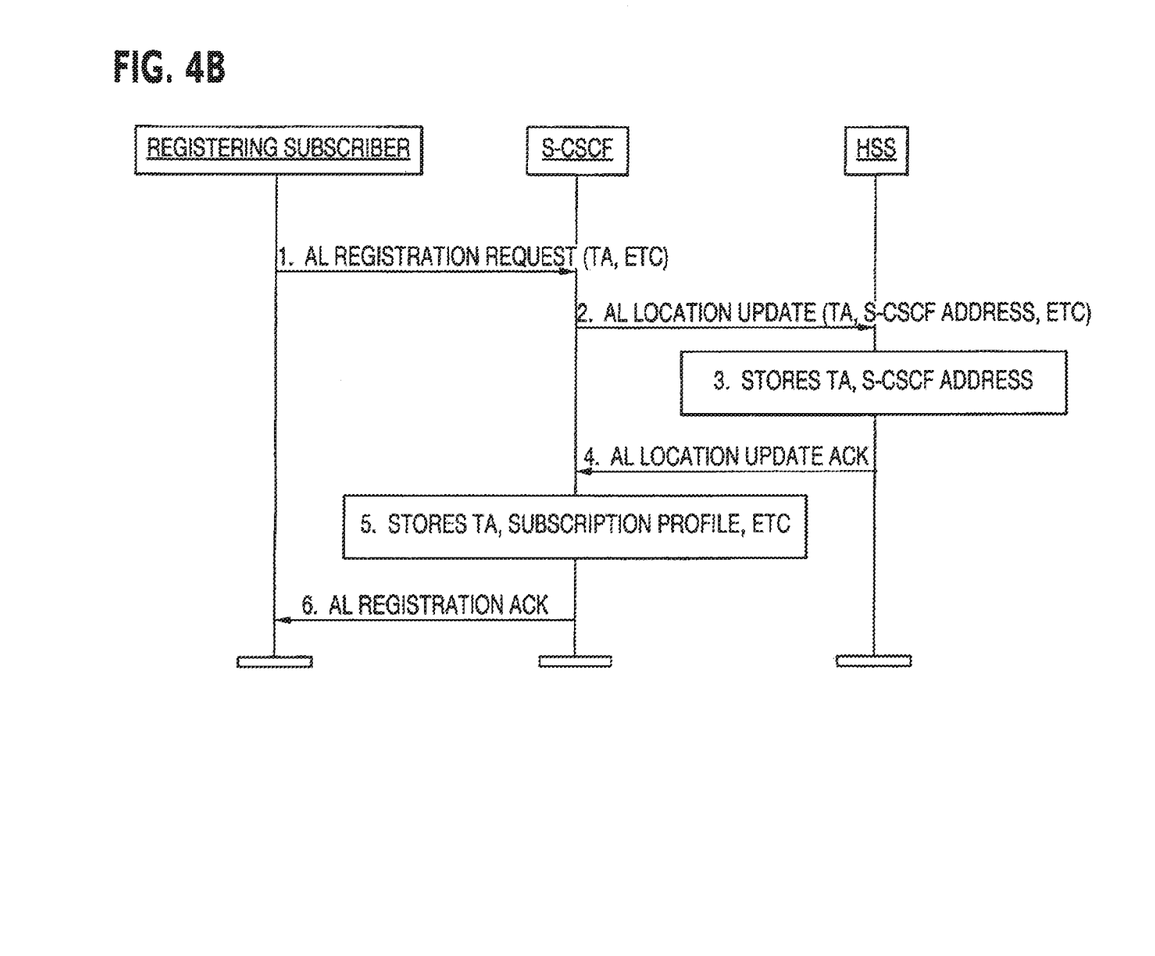
FIG. 4B illustrates an example of reaching a called party after losing TA information in a mobile network in accordance with the present disclosure.

As illustrated in FIG. 4B in step 1, the registering subscriber forwards an AL registration request to the S-CSCF including the TA. In step 2, an AL Location Update is forwarded to the HSS including the TA and S-CSCF address. In step 3, the HSS stores the updated TA and S-CSCF address (in a hard disk, for example, or other non-volatile memory). In step 4, the HSS forwards an AL Location Update acknowledgement to the S-CSCF which stores the TA and subscription profile and other data in step 5. In step 6, the S-CSCF forwards an AL registration acknowledge to the registering subscriber.

In the second option, the same level of protection against loss applies for the subscriber's TA stored in the S-CSCF as that of the S-CSCF address stored in the HSS. For example, the subscriber's TA can be backed up in a hard disk, or other non-volatile memory in the S-CSCF.

In the case of an S-CSCF crash, when the S-CSCF restarts, all of the information regarding the mobile subscribers registered with it, including the information on how to reach the mobile subscribers, is lost. In such a situation, it is not possible to deliver mobile terminated calls to the mobile subscribers that were registered with the S-CSCF that was restarted.

In providing a solution to the above-noted problem in accordance with the third option, the following assumptions are made:

1) IPv6 is adopted for IP addressing and a subscriber is given a home address at subscription time. This home address is stored in a UMS.

2) The subscriber is in an area assigned to an S-CSCF and has registered with it and has provided its' TA, that is, the current address where the subscriber is reachable. Such an address is not the static home address but rather is the Care-of Address. Whenever the S-CSCF has to forward signaling to the mobile subscriber, it uses the Care-of Address. The subscriber has also registered its current Care of Address with its Home Agent.

3) The S-CSCF restarts due to a fault and loses the information about the mobile station.

Figure 5:
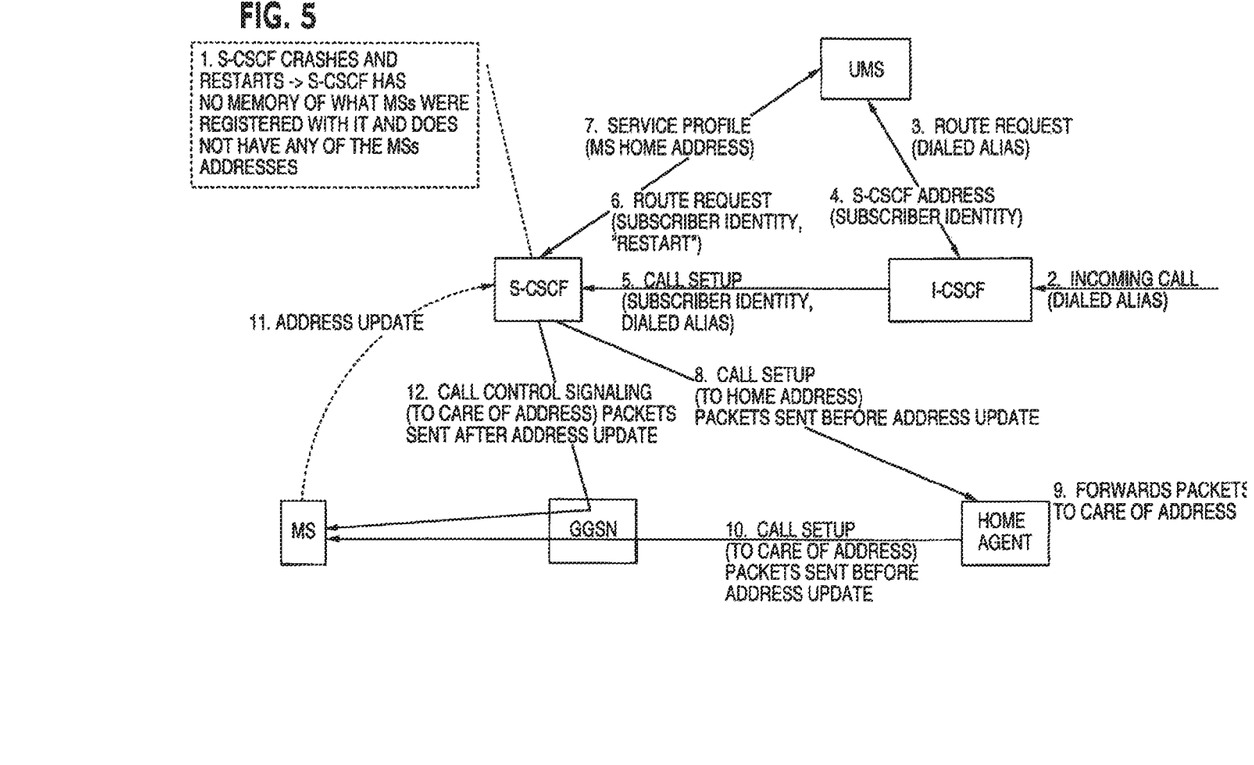
FIG. 5 illustrates the signal flow in the case of a recovery after a CSCF crash in accordance with another embodiment of the present disclosure.

The following procedure in accordance with the present disclosure, as illustrated in FIG. 5, may, for example, be used for mobile terminating call delivery when, as illustrated in 1, the S-CSCF crashes and restarts, the S-CSCF has no memory of what mobile stations (MSs) were registered with the S-CSCF and does not have any of the MSs Care of Address addresses:

When an incoming call at 2 reaches a CSCF in the home network, either from another IP based terminal or from an MGCF (Media Gateway Control Function), the I-CSCF queries at 3 the UMS based on the alias dialed by the calling party.

During registration, the UMS has stored information about the S-CSCF and information as to how the mobile subscriber can be reached. More particularly, the UMS has stored the address of the S-CSCF, that is, the address where CC (Call Control) signaling must be forwarded. At this point, two scenarios are possible:

The information in the UMS regarding the S-CSCF is still valid; the UMS returns at 4 the address of the S-CSCF and the Subscriber Identity and then forwards the call setup 5 to the S-CSCF.

The S-CSCF, not having information available for the alias to which the call corresponds due to a crash, queries 6 the UMS based on the Subscriber Identity optionally indicating that a restart took place in order to trigger a profile download.

The UMS returns at 7 the Home Address of the MS to the S-CSCF.

The S-CSCF forwards at 8 the signaling to the Home Address which is the home agent.

The home agent receives the packets at 9 and forwards them at 10 to the MS using the Care of Address obtained during the Mobile IP signaling exchanged when the Care-of Address was created (the usual procedure in Mobile IP).

When the MS receives the first packet, it sends at 11 a message to the S-CSCF which sent the packet to update the address indicating the Care of Address as the correct address to be used to reach the subscriber (the usual procedure in Mobile IP) and call control signalling is sent at 12 from the S-CSCF to the MS.

When the call is terminated the subscriber can optionally re-register with the S-CSCF.

2) The information in the UMS is not valid; the UMS returns the Home Address of the mobile subscriber.

The I-CSCF forwards the signaling to the Home Address.

The Home Agent receives the packets and forwards them to the Care-of Address obtained during the Mobile IP signaling exchanged when the Care-of Address was created (the usual procedure in Mobile IP).

When the mobile subscriber receives the first packet, it sends a message to the I-CSCF which sent the packet to update the address indicating the Care of Address as the correct address to be used to reach the subscriber (the usual procedure in Mobile IP).

When the call is terminated the subscriber can optionally re-register with a S-CSCF.

This concludes the description of the example embodiments. Although the present invention has been described with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, drawings, and appended claims without departing from the spirit of the invention. For example, the example embodiments of the present invention have been described with respect to currently used networks, such as 313 All-IP mobile networks, and standards for simplicity. It is, of course, understood that the present invention is not limited thereto. In addition to variations and modifications in the component parts and/or arrangements, alternative uses will also be apparent to those skilled in the art.

What is claimed is:

1. A method comprising:
    receiving a call setup request including a subscriber identity and a dialed alias for a subscriber at a serving-call state control function (S-CSCF) for call registration after the S-CSCF crashes and restarts;
    sending a route request from the S-CSCF to a user mobility server (UMS) to trigger a profile download including the home address of the subscriber;
    receiving the home address of the subscriber at the S-CSCF from the UMS to facilitate communication from the S-CSCF to the home address; and
    sending the call setup request from the S-CSCF to a home agent at the home address of the subscriber to establish a call with a mobile station.

2. The method of claim 1, wherein the call setup request includes a subscriber identity associated with the subscriber.

3. The method of claim 2, wherein the sending a route request comprises querying the UMS based on the subscriber identity.

4. The method of claim 1, wherein the sending the call setup request comprises sending the call setup request to a care of address of the subscriber.

5. The method of claim 1, wherein receiving the home address of the subscriber and the sending the call setup request are performed only if information about the S-CSCF stored in the UMS is valid.

6. The method of claim 1, further comprising forwarding the call setup request to a care of address of the subscriber.

7. A non-transitory computer-readable medium having instructions stored thereon, the instructions comprising:
   instructions for receiving a call setup request including a subscriber identity and a dialed alias for a subscriber at a serving-call state control function (S-CSCF) for call registration after the S-CSCF crashes and restarts;
   instructions for sending a route request from the S-CSCF to a user mobility server (UMS) to trigger a profile download including the home address of the subscriber;
   instructions for receiving the home address of the subscriber at the S-CSCF from the UMS to facilitate communication from the S-CSCF to the home address; and
   instructions for sending the call setup request from the S-CSCF to a home agent at the home address of the subscriber to establish a call with a mobile station.

8. The non-transitory computer-readable medium of claim 7, wherein the call setup request includes a subscriber identity associated with the subscriber.

9. The non-transitory computer-readable medium of claim 8, wherein the instructions for sending a route request comprises instructions for querying the UMS based on the subscriber identity.

10. The non-transitory computer-readable medium of claim 7, wherein the instructions for sending the call setup request comprises instructions for sending the call setup request to a care of address of the subscriber.

11. The non-transitory computer-readable medium of claim 7, wherein instructions for receiving the home address of the subscriber and instructions for sending the call setup request are performed only if information about the S-CSCF stored in the UMS is valid.

12. The non-transitory computer-readable medium of claim 7, further comprising instructions for forwarding the call setup request to a care of address of the subscriber.

13. A system comprising:
    an interrogating-call state control function (I-CSCF) configured to:
        receive a call for a subscriber;
        send a first route request to a user mobility server (UMS);
        receive an address of a server-call state control function (S-CSCF) from the UMS; and
        send a call setup request including a subscriber identity and a dialed alias to the S-CSCF for call registration after the S-CSCF crashes and restarts; and
    the S-CSCF configured to:
        receive the call setup request from the I-CSCF;
        send a second route request to the UMS to trigger a profile download including the home address of the subscriber;
        receive the home address of the subscriber from the UMS to facilitate communication from the S-CSCF to the home address; and
        send the call setup request to a home agent at the home address of the subscriber to establish a call with a mobile station.

14. The system of claim 13, wherein the I-CSCF is configured to receive the address of the S-CSCF and to send the call setup request to the S-CSCF only if information about the S-CSCF stored in the UMS is valid.

15. The system of claim 13, wherein the S-CSCF is further configured to send the call setup request to a care of address of the subscriber.

16. The system of claim 13, further comprising the home agent, wherein the home agent is configured to receive the call setup request from the S-CSCF and forward the call setup request to a care of address of the subscriber.

17. The system of claim 13, wherein the call setup request includes the identity of the subscriber.

18. The system of claim 17, wherein the S-CSCF is further configured to query the UMS based on the identity of the subscriber.

* * * * *